US008309487B2

(12) United States Patent
Shiratori et al.

(10) Patent No.: US 8,309,487 B2
(45) Date of Patent: Nov. 13, 2012

(54) EXHAUST GAS PURIFYING CATALYST AND METHOD FOR PRODUCING THE SAME

(75) Inventors: Kazuyuki Shiratori, Yokohama (JP); Masanori Nakamura, Yokosuka (JP); Hironori Wakamatsu, Yokohama (JP); Katsuo Suga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/002,929

(22) PCT Filed: Jun. 4, 2009

(86) PCT No.: PCT/JP2009/060221
§ 371 (c)(1),
(2), (4) Date: Jan. 6, 2011

(87) PCT Pub. No.: WO2010/007839
PCT Pub. Date: Jan. 21, 2010

(65) Prior Publication Data

US 2011/0111952 A1 May 12, 2011

(30) Foreign Application Priority Data

Jul. 16, 2008 (JP) ................................ 2008-185189

(51) Int. Cl.
*B01J 23/00* (2006.01)
*B01J 21/00* (2006.01)
*B01J 29/00* (2006.01)
*B01J 37/00* (2006.01)

(52) U.S. Cl. ........ 502/242; 502/252; 502/254; 502/261; 502/262; 502/263; 502/303; 502/304; 502/306; 502/309; 502/313; 502/323; 502/325; 502/326; 502/327; 502/328; 502/332; 502/333; 502/334; 502/339; 502/340; 502/341; 502/355; 502/407; 502/415; 502/439

(58) Field of Classification Search .................. 502/242, 502/252, 254, 261, 262, 263, 303, 304, 306, 502/309, 313, 314, 323, 325–328, 332–334, 502/339–341, 355, 407, 415, 439
See application file for complete search history.

(56) References Cited

U.S. PATENT DOCUMENTS 5,102,853 A * 4/1992 Chattha et al. ................ 502/333
5,968,870 A * 10/1999 Iizuka et al. .................. 502/325
6,159,897 A * 12/2000 Suzuki et al. ................. 502/351
(Continued)

FOREIGN PATENT DOCUMENTS

CN 101087651 A 12/2007
(Continued)

*Primary Examiner* — Cam N. Nguyen
(74) *Attorney, Agent, or Firm* — Foley & Lardner LLP

(57) ABSTRACT

An exhaust gas purifying catalyst (1) is composed of: a noble metal (2); a first compound (3); and a second compound (4). The noble metal (2) is supported on the first compound (3). The exhaust gas purifying catalyst (1) includes units having a structure in which the first compound (3) supporting the noble metal (2) is surrounded by the second compound (4), and the first compound (3) supporting the noble metal (2) is isolated from one another by the second compound (4). The noble metal (2) is one or more selected from [Pt, Pd and Rh], the first compound (3) contains Ti as a main component, and the second compound (4) contains, as a main component, one or more selected from [Al and Si].

7 Claims, 4 Drawing Sheets

2
3
2
2
2
3
2
2
7

U.S. PATENT DOCUMENTS

| | | | | |
|---|---|---|---|---|
| 6,221,804 | B1 * | 4/2001 | Yamada et al. | 502/326 |
| 6,391,276 | B1 * | 5/2002 | Suda et al. | 423/598 |
| 6,602,479 | B2 * | 8/2003 | Taniguchi et al. | 423/239.1 |
| 6,673,739 | B2 * | 1/2004 | Yamazaki et al. | 502/216 |
| 6,852,665 | B2 * | 2/2005 | Imagawa et al. | 502/302 |
| 6,911,414 | B2 * | 6/2005 | Kimura et al. | 502/349 |
| 6,926,875 | B2 * | 8/2005 | Hatanaka et al. | 423/239.1 |
| 6,956,008 | B2 * | 10/2005 | Takeshima et al. | 502/326 |
| 7,037,875 | B2 * | 5/2006 | Hu et al. | 502/304 |
| 7,056,859 | B2 * | 6/2006 | Hachisuka | 502/327 |
| 7,169,735 | B2 * | 1/2007 | Sagae | 502/326 |
| 7,229,947 | B2 * | 6/2007 | Hara et al. | 502/327 |
| 7,247,597 | B2 * | 7/2007 | Morikawa et al. | 502/304 |
| 7,276,212 | B2 * | 10/2007 | Hu et al. | 422/177 |
| 7,390,770 | B2 * | 6/2008 | Nochi et al. | 502/327 |
| 7,449,237 | B2 * | 11/2008 | Chan et al. | 428/403 |
| 7,547,656 | B2 * | 6/2009 | Miura | 502/327 |
| 7,572,543 | B2 * | 8/2009 | Mei et al. | 429/483 |
| 7,585,811 | B2 * | 9/2009 | Nakamura et al. | 502/327 |
| 7,601,670 | B2 * | 10/2009 | Yasuda et al. | 502/326 |
| 7,605,108 | B2 * | 10/2009 | Wakamatsu et al. | 502/326 |
| 7,618,919 | B2 * | 11/2009 | Shimazu et al. | 502/439 |
| 7,674,744 | B2 * | 3/2010 | Shiratori et al. | 502/327 |
| 7,713,908 | B2 * | 5/2010 | Yamamoto et al. | 502/300 |
| 7,713,911 | B2 * | 5/2010 | Wakamatsu et al. | 502/332 |
| 7,851,405 | B2 * | 12/2010 | Wakamatsu et al. | 502/332 |
| 7,867,943 | B2 * | 1/2011 | Takeshima | 502/327 |
| 7,923,107 | B2 * | 4/2011 | Thomas et al. | 428/335 |
| 7,935,653 | B2 * | 5/2011 | Shimazu et al. | 502/302 |
| 7,981,834 | B2 * | 7/2011 | Goto et al. | 502/407 |
| 7,989,387 | B2 * | 8/2011 | Miura | 502/304 |
| 8,038,954 | B2 * | 10/2011 | Li | 422/180 |
| 8,080,494 | B2 * | 12/2011 | Yasuda et al. | 502/327 |
| 2009/0131251 | A1 | 5/2009 | Matsueda et al. | |
| 2009/0275467 | A1 | 11/2009 | Shiratori et al. | |
| 2009/0280978 | A1 | 11/2009 | Nakamura et al. | |

FOREIGN PATENT DOCUMENTS

| | | | |
|---|---|---|---|
| EP | 1 175 935 | A2 | 1/2002 |
| EP | 1 839 745 | A1 | 10/2007 |
| EP | 1 955 765 | A1 | 8/2008 |
| JP | 2002-177787 | A | 6/2002 |
| JP | 2007-111640 | A | 5/2007 |
| JP | 2007-229641 | A | 9/2007 |
| WO | WO 2007/052627 | A1 | 5/2007 |
| WO | WO 2007/119658 | A1 | 10/2007 |
| WO | WO 2008/004385 | A1 | 1/2008 |

* cited by examiner (a)

(b)

EXHAUST GAS PURIFYING CATALYST AND METHOD FOR PRODUCING THE SAME

TECHNICAL FIELD

The present invention relates to an exhaust gas purifying catalyst suitable for application to treatment for purifying exhaust gas discharged from an internal combustion engine, and to a method of producing the same.

BACKGROUND ART

In recent years, an exhaust gas purifying catalyst, which supports particles of noble metal such as platinum (Pt) on a support of metal oxide such as alumina ($Al_2O_3$), has been being widely used in order to remove harmful substances such as a hydrocarbon-based compound (HC), carbon monoxide (CO) and nitrogen oxide ($NO_x$), which are contained in exhaust gas discharged from an internal combustion engine. In the conventional exhaust gas purifying catalyst, a large amount of such noble metal particles is used in order to enhance durability of the noble metal particles against variations of an ambient atmosphere. However, it is not desirable to use the large amount of noble metal particles from a viewpoint of protecting the earth's resources.

As a method for reducing such a usage amount of the noble metal, there is a method of reducing a particle diameter of the noble metal particles supported on the support. As the particle diameter of the noble metal particles is smaller, a specific surface area thereof becomes larger. Accordingly, it is sufficient that the usage amount of noble metal for obtaining desired purification performance of the catalyst is small. However, when the particle diameter of the noble metal particles is small, the noble metal particles mutually cause thermal aggregation (sintering) owing to a high-temperature and long-term use thereof, and accordingly, there is an apprehension that the durability of the noble metal particles may be decreased.

In this connection, an exhaust gas purifying catalyst has been developed, in which the noble metal particles are supported on first compounds, and the first compounds supporting the noble metal particles thereon are contained within second compounds, whereby the first compounds, on which the noble metal is supported, are separated from one another by the second compounds (Patent Literature 1). In the exhaust gas purifying catalyst having such a structure, the noble metal particles are supported on the first compound, and the noble metal particles are thereby physically fixed to the first compound, whereby movement and aggregation of the noble metal particles are suppressed. Moreover, the first compounds, which support the noble metal particles thereon, are separated from one another by the second compounds, whereby the first compounds, which support the noble metal thereon, are suppressed from mutual contact and aggregation. In such a way, the noble metal particles are prevented from being aggregated after a durability test, whereby the durability thereof can be enhanced.

CITATION LIST

Patent Literature

Patent Document 1: Pamphlet of International Publication WO 2007/052627

SUMMARY OF INVENTION

Technical Problem

In the exhaust gas purifying catalyst described in Patent Literature 1, the first compound that supports the noble metal particles thereon is made of an oxide containing Ce as a main component. Therefore, in the case of purifying exhaust gas under such conditions where an air-fuel ratio periodically causes atmospheric variations between rich and lean while taking a theoretical air-fuel ratio (stoichiometry) as a center, this conventional exhaust gas purifying catalyst can absorb the variations of the atmosphere in the vicinities of the catalyst particles by an oxygen absorption/release capability inherent in the oxide containing Ce as a main component. In such a way, the sintering of the noble metal is appropriately suppressed, and active oxygen required for a three-way reaction is appropriately supplied, whereby the exhaust gas purifying catalyst has high purification performance. Eventually, an activity enhancement effect for the noble metal particles by the first compound can be maintained without increasing production cost and an environmental load.

However, in the case of applying the above-mentioned exhaust gas purifying catalyst to a gasoline direct injection engine and a diesel engine, which are operated in a state where the air-fuel ratio is on a leaner side than such a stoichiometric ratio, the exhaust gas purification performance has sometimes been decreased by the fact that oxidation occurs in the noble metal.

Solution to Problem

In order to solve the foregoing problem, an exhaust gas purifying catalyst of the present invention includes units, each including: a noble metal; a first compound; and a second compound, and having a structure in which the noble metal is supported on the first compound, the first compound supporting the noble metal is surrounded by the second compound, and the first compound supporting the noble metal is isolated from one another by the second compound. The noble metal is one or more selected from [Pt, Pd and Rh], the first compound contains Ti as a main component, and the second compound contains, as a main component, one or more selected from [Al and Si].

Moreover, a method of producing an exhaust gas purifying catalyst of the present invention includes the step of: forming a first compound into a colloid in which a primary particle diameter is 100 nm or less, wherein the first compound is brought into contact with a noble metal; and subsequently forming a second compound on a periphery of the colloided first compound with which the noble metal is brought into contact.

Furthermore, a method of producing an exhaust gas purifying catalyst of the present invention includes the step of: pulverizing a secondary particle aggregate of a first compound, thereby setting a secondary particle diameter of the first compound at 2 μm or less, wherein the first compound is brought into contact with a noble metal; and subsequently forming a second compound on a periphery of the pulverized first compound with which the noble metal is brought into contact.

Advantageous Effects of Invention

In accordance with the exhaust gas purifying catalyst according to the present invention, in the case of being used for the engine, such as the direct injection engine and the diesel engine, which is to be operated in a state where the air-fuel ratio is on the leaner side than the stoichiometric ratio, the exhaust gas purifying catalyst exerts excellent exhaust gas purification performance.

In accordance with the method of producing an exhaust gas purifying catalyst according to the present invention, the exhaust gas purifying catalyst of the present invention, which has the above-described effect, can be produced easily.

DESCRIPTION OF EMBODIMENTS

A description is made of an embodiment of an exhaust gas purifying catalyst of the present invention.

Figure 1:
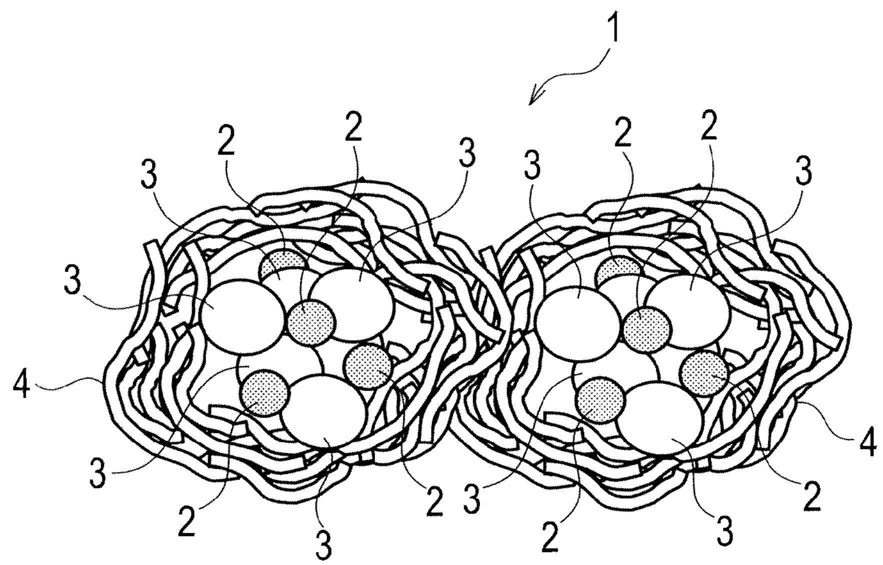
FIG. 1 is a schematic view showing a configuration of an exhaust gas purifying catalyst serving as an embodiment of the present invention.

FIG. 1 is a schematic view of an exhaust gas purifying catalyst serving as an embodiment of the present invention. The exhaust gas purifying catalyst 1 shown in this drawing is composed of: noble metal particles 2 having catalytic activity; first compounds 3 which contact the noble metal particles 2 and suppress movement of the noble metal particles 2; and second compounds 4 which surround the noble metal particles 2 and the first compounds 3, suppress the movement of the noble metal particles 2, and suppress aggregation of the first compounds 3, the aggregation following mutual contact of the first compounds 3. The first compounds 3 support the noble metal particles 2. Moreover, aggregates of a plurality of the first compounds 3 which support the noble metal particles 2 are positioned in sections partitioned by the second compounds 4.

In the exhaust gas purifying catalyst 1 having such a structure, the first compounds 3 contact and support the noble metal particles 2, thereby function as an anchor agent of chemical bonding, and chemically suppress the movement of the noble metal particles. Moreover, a form is made, in which the noble metal particles 2 and the first compounds 3 are covered with and surrounded by the second compounds 4, whereby the movement of the noble metal particles 2 is physically suppressed. Furthermore, the noble metal particles 2 and the first compounds 3 are positioned in the sections partitioned by the second compounds 4, whereby the first compounds 3 are suppressed from contacting one another and being aggregated beyond the sections partitioned by the second compounds 4. From these facts, without increasing production cost and an environmental load, the exhaust gas purifying catalyst 1 can prevent a decrease of the catalytic activity, which may be caused by the aggregation of the noble metal particles 2, and moreover, can maintain an effect of enhancing the activity of the noble metal particles 2 by the first compounds 3.

One of features of the present invention is that the first compounds contain Ti as a main component. In the conventional exhaust gas purifying catalyst in which the first compounds are composed of the oxide containing Ce as a main component, when the exhaust gas purifying catalyst is applied to a gasoline direct injection engine and a diesel engine, which are operated in a state where an air-fuel ratio is on a leaner side than the stoichiometry, the following phenomenon sometimes occurs since a large amount of oxygen is present in the atmosphere. Specifically, performance of the exhaust gas purifying catalyst is sometimes decreased by the fact that the noble metal in the vicinities of the first compounds is subjected to adsorption poisoning owing to excessive oxygen adsorption at the time of low temperature, and subjected to noble metal oxidation owing to excessive oxygen release at the time of high temperature.

As opposed to this, in the present invention, as the first compounds, Ti is used, which has such an anchor function, has a lower oxygen absorption/release function as compared with Ce, and has an alkaline surface in a similar way to Ce. From this fact, it is possible to maintain the durability enhancement of the noble metal by being provided with the structure shown in FIG. 1. As a result, oxidation performance of the catalyst, which is required to purify the exhaust gas by oxidizing under the atmosphere from the stoichiometry to the lean, is significantly enhanced. In particular, the exhaust gas purifying catalyst of the present invention can effectively oxidize HC in exhaust gas components, and particularly, methane difficult to oxidize, and accordingly, has a large margin for the performance enhancement.

In the exhaust gas purifying catalyst of the present invention, the reason why the above-mentioned oxidation performance of the catalyst is significantly enhanced is not exactly obvious. However, the reason is conceived to be that the first compounds are compounds containing Ti as a main component, and thus the noble metal oxidation is suppressed. For example, in the case where the noble metal is Pt, it is known that Pt is changed to states of metal Pt, PtO and $PtO_2$ depending on a degree of the oxidation, and among these states, the metal Pt has the highest oxidation performance for the exhaust gas, and the oxidation performance is decreased in order from the metal Pt through PtO to $PtO_2$. Such oxidation states of the noble metal as described above are changed by a reaction atmosphere. However, by the inventors, it has been proven that the oxidation states are changed also by physical properties of the support that supports the noble metal particles, that is, by physical properties of the first compounds in the present invention. In particular, in comparison with the case where the first compounds which support the noble metal are the oxide containing Ce as a main component, in the case where the first compounds are the compounds containing Ti as a main component, Pt is likely to take an electronic state similar to that of the metal Pt, and oxidation activity thereof is enhanced. Note that it is possible to observe such changes of the oxidation state by XPS. From the above-described facts, in the present invention, the oxidation activity of the catalyst can be enhanced by using Ti as the first compounds.

The noble metal is at least one element selected from [Pt, Pd and Rh], each of which has a catalytic function, and is suitable for use in the exhaust gas purifying catalyst.

The second compounds are compounds containing, as main components, one or more selected from [Al and Si], each of which is a material having heat resistance, and being capable of forming pores therein, the pores allowing the exhaust gas to reach the noble metal particles 2 surrounded by the second compounds 4. Specifically, $Al_2O_3$, $SiO_2$, an Al—Si composite oxide and the like can be applied as the second compounds. Moreover, the second compounds may be a mixture of $Al_2O_3$ and $SiO_2$.

Units of the exhaust gas purifying catalyst of the present invention, that is, units having a structure, in which the noble metal is supported on the first compounds, the first compounds supporting this noble metal are contained in the second compounds, and the first compounds supporting the noble metal are isolated from one another by the second compounds, preferably include an unit in which an amount of the noble metal is $8\times10^{-20}$ mol or less.

Figure 2:
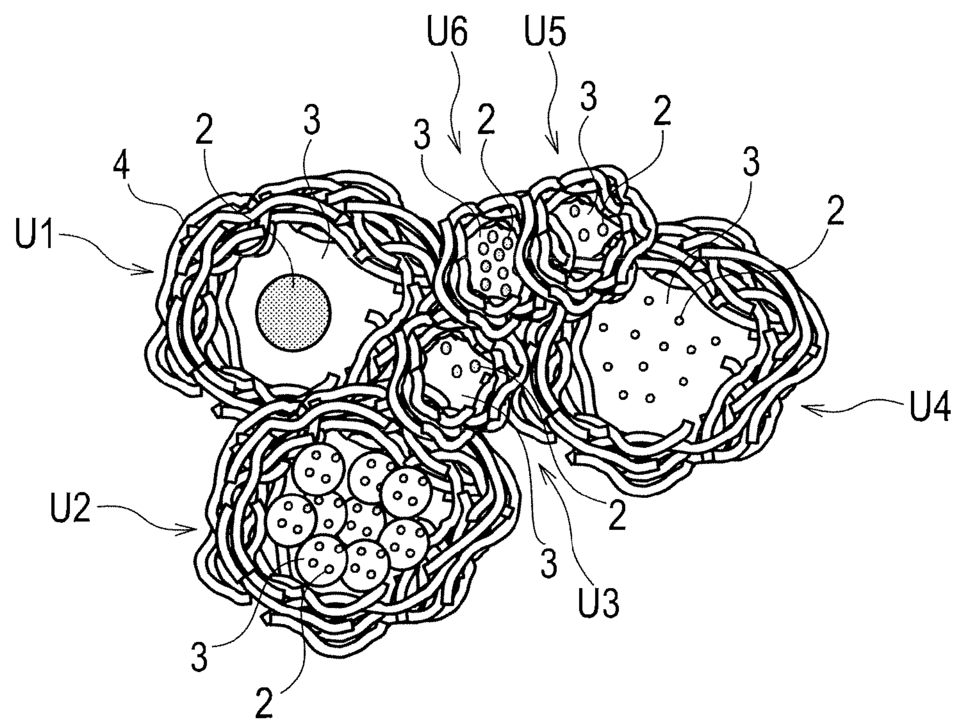
FIG. 2 is a schematic view showing a configuration of an exhaust gas purifying catalyst serving as another embodiment of the present invention.

FIG. 2 is a schematic view showing an example of the units of the exhaust gas purifying catalyst of the present invention. The exhaust gas purifying catalyst 1 shown in this drawing is the same as the exhaust gas purifying catalyst 1 shown in FIG. 1 in being composed of: the noble metal particles 2; the first compounds 3 which support the noble metal particles 2; and the second compounds 4 which surround the noble metal particles 2 and the first compounds 3. However, in the exhaust gas purifying catalyst 1 in FIG. 2, the noble metal particles 2 and the first compounds 3 are contained in various modes in the sections partitioned by the second compounds 4.

In FIG. 2, among the units, each of which has the structure separated from others by the second compounds 4, in a unit U1, a single first compound 3 that supports a single noble metal particle 2 is contained. Moreover, in a unit U2, a plurality of first compounds 3 which support a plurality of noble metal particles 2 are contained in a form of aggregates (secondary particles). Furthermore, in units U3 to U6, single first compounds 3, each of which supports a plurality of noble metal particles 2, are contained at a variety of particle diameters.

In a similar way to the exhaust gas purifying catalyst 1 shown in FIG. 1, in all of the units U1 to U6 of the exhaust gas purifying catalyst 1 shown in FIG. 2, the first compounds 3 are suppressed from contacting one another and being aggregated beyond the sections partitioned by the second compounds 4. Hence, the exhaust gas purifying catalyst 1 shown in FIG. 2 has similar effects to those of the exhaust gas purifying catalyst 1 shown in FIG. 1.

Figure 3:
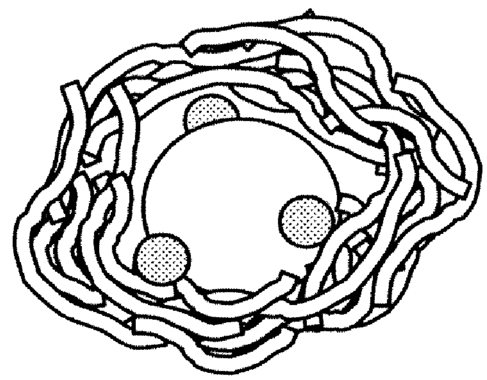
FIG. 3 is a schematic view showing an example where noble metal particles 2 in one unit are still unaggregated and already aggregated.
Figure 3:
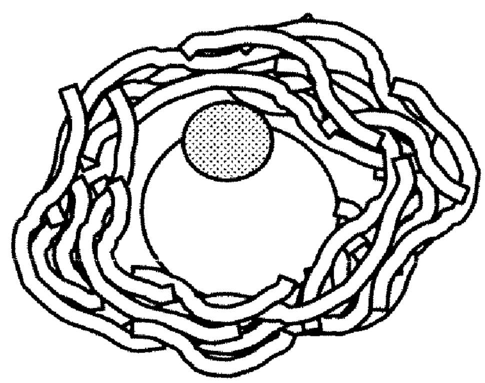

In the units having the structure separated by the second compounds 4, preferably, the noble metal particles are contained by an amount of $8\times10^{-20}$ mol or less in total. As shown in FIG. 2, the noble metal particles 2 and the first compounds 3, which are contained in the sections partitioned by the second compounds 4, have a variety of modes. When the exhaust gas purifying catalyst is put into practical use, a plurality of the noble metal particles 2 sometimes move and are aggregated with one another in these sections owing to a high temperature and the like of the atmosphere. In this case, in all of the units U1 to U6, the noble metal particles 2 do not move to the second compounds 4 owing to the effect of the first compounds 3 as the anchor agent, and are aggregated into one or plural noble metal particles only in the units. FIGS. 3(*a*) and 3(*b*) show an example where the noble metal particles 2 in one unit are still unaggregated and already aggregated.

Figure 4:
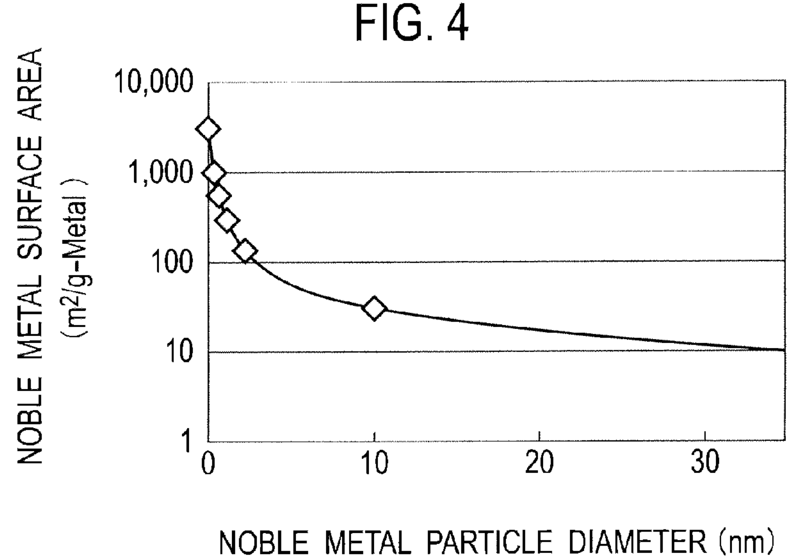
FIG. 4 is a graph showing a relationship between a noble metal particle diameter and a noble metal surface area.

Here, even if the noble metal particles are aggregated in one unit, if a particle diameter of the aggregated noble metal particles is 10 [nm] or less, then the noble metal particles exhibit sufficient catalytic activity, thus making it possible to suppress a deterioration of the catalytic activity, which may be caused by the aggregation. FIG. 4 is a graph showing a relationship between such a noble metal particle diameter and a noble metal surface area with regard to platinum and palladium, each of which is the noble metal having the catalytic activity. Note that, since both of the cases where the noble metal is platinum and palladium represent substantially the same curves, these curves are represented as one curve in this graph. As obvious from this graph, if the particle diameter of the noble metal is 10 [nm] or less, then the particle surface area is large, and the sufficient activity is obtained. Accordingly, the deterioration of the catalytic activity, which may be caused by the aggregation, can be suppressed.

Figure 5:
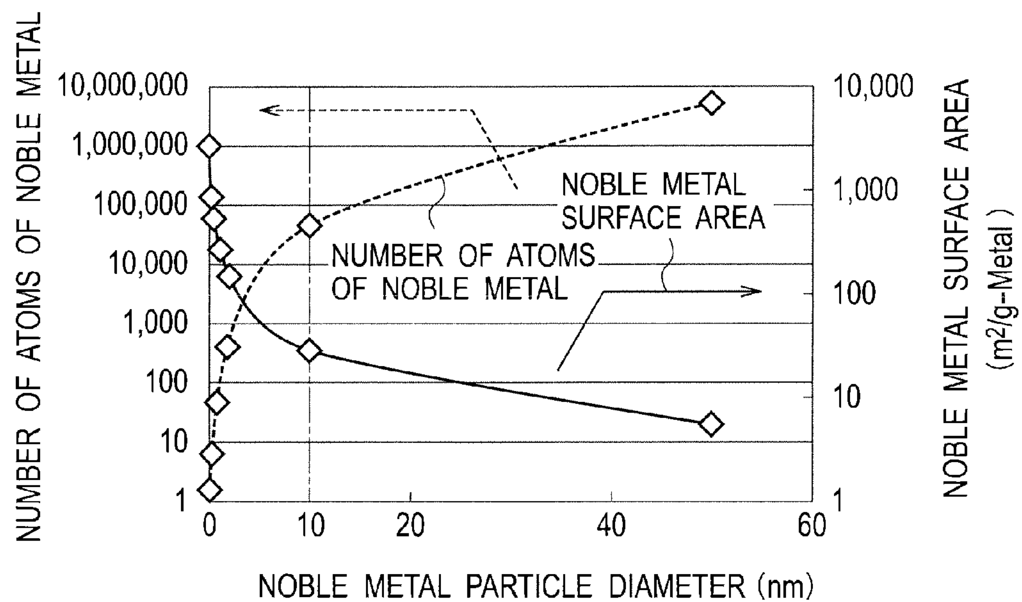
FIG. 5 is a graph showing a relationship between the noble metal particle diameter and the number of atoms of noble metal.

FIG. 5 is a graph showing a relationship between the noble metal particle diameter and the number of atoms of the noble metal with regard to platinum and palladium, each of which is the noble metal having the catalytic activity. Note that, since both of the cases where the noble metal is platinum and palladium represent substantially the same curves, these curves are represented as one curve in this graph. As obvious from this graph, the number of atoms when the particle diameter of the noble metal is 10 [nm] is approximately 48,000. In conversion to the number of moles, this value becomes the amount of $8\times10^{-20}$ mol or less.

From these viewpoints, in all of the modes of the units U1 to U6, even if the noble metal particles are aggregated to one in each of the units, the deterioration of the catalytic activity can be suppressed in such a manner that the amount of noble metal in the unit is restricted to be set at the amount of $8\times10^{-20}$ mol or less.

As means for reducing the amount of noble metal, which is contained in the unit, to $8\times10^{-20}$ mol or less, there is: means for lowering a support concentration of the noble metal particles 2 on the first compounds 3; or reducing the particle diameter of the first compounds 3 which support the noble metal particles 2. In the present invention, the means for reducing the amount of noble metal is not limited to these means. However, in the case of considering the actual catalyst production, in the former method of lowering the support concentration, a capacity of a honeycomb substrate coated with the exhaust gas purifying catalyst must be increased in order to maintain the predetermined performance of the exhaust gas purifying catalyst. Hence, it is necessary to coat the honeycomb substrate with the catalyst, for example, of which coating amount is as large as ten times a usual amount. Accordingly, the former method is not realistic.

With regard to the particle diameter of the first compounds 3, a median particle diameter thereof is preferably set at 2 [μm] or less. In the present invention, the particle diameter of the first compounds 3 dispersed independently refers to a median diameter of the secondary particles thereof. The first compounds 3 have a function as the anchor agent that contacts the noble metal particles 2 and suppresses the movement of the noble metal particles 2. Such an anchor effect of the anchor agent is affected by a size of the first compounds 3 themselves. As in the conventional exhaust gas purifying catalyst, even if the noble metal is simply impregnated and supported on the powder-state first compounds, for example, a Ti oxide or the like, and a resultant is dispersed into alumina, then it is difficult for an obtained exhaust gas purifying catalyst to exert the above-described sufficient effect of suppressing the aggregation of the noble metal. For example, in the case of obtaining the particles of the first compounds 3 by a conventional milling production method using a ball mill or the like, only a particle diameter of 2 to 3 [μm] can be obtained to the minimum. In the exhaust gas purifying catalyst using the particles of the first compounds 3 having the particle diameter of 2 to 3 [μm] to the minimum as described above, wherein the noble metal particles 2 are supported on the particles of the first compounds 3 by an amount determined based on an upper limit of the coating amount of the catalyst on an actual cordierite honeycomb substrate and based on a usage amount of the noble metal, the noble metal particles 2 are aggregated to several ten [nm] owing to a high-temperature and long-term use thereof, and deteriorates the catalytic activity. Hence, in the case of applying, to the actual catalyst, the first compounds 3 contained in the sections partitioned by the second compounds 4, the median particle diameter of the first compounds 3 is preferably 2 [μm] or less. A more preferable median diameter of the first compounds is 0.5 [μm] or less. With regard to the first compounds as described above, in which such a mean particle diameter is 2 [μm] or less, a production method thereof is described later in detail. However, the first compounds are obtained by converting the above-mentioned first compounds, which support the noble metal, into fine colloid, by appropriately applying a milling method using an apparatus capable of milling the first compounds to 2 [μm] or less, and so on.

A lower limit of the median particle diameter of the first compounds 3 is determined as a particle diameter of the first compounds 3 producible by an industrial production process, and is not particularly limited.

More specifically, the first compounds according to the present invention, which contain Ti as a main component, are preferably an oxide including Ti. The oxide including Ti may be an oxide in which metal elements are only Ti, that is, a Ti oxide such as $TiO_2$. However, more preferably, the oxide including Ti is a composite oxide of Ti and a third compound, and the third compound is a compound of at least one element selected from [Ce, Zr, Ba, Mg, W, Nd and Y]. To the first compounds, it is possible to add one more types of the third compound in addition to Ti. Any of [Ce, Zr, Ba, Mg, W, Nd and Y] is a component effective for the case of being added as an accessory component to the first compounds of the present invention. At least one element selected from [Ce, Zr, Ba, Mg, W, Nd and Y] or a compound thereof is added into the first compounds, whereby effects are obtained, such as: adsorption promotion for an acidic substance by an increase of surface alkalinity; and enhancement of heat resistance by achieving stabilization of a crystal structure of the first compounds by the addition of the elements of these accessory components. As the third compound, for example, there are mentioned oxides of the elements of the accessory components, which are $CeO_2$, $ZrO_2$, BaO, MgO, $WO_3$, $Nd_2O_3$, $Y_2O_3$ and the like. Moreover, a content ratio of the third compound in the first compounds is not particularly limited; however, is less than 50 mol % since the first compounds contain Ti as a main component in the present invention.

Moreover, the first compounds may be not only such composite oxides of the above-mentioned Ti oxides and the third compound but also mixtures of the Ti oxide and the third compound.

The second compounds can contain, as a main component, one or more selected from [Al and Si], and further, can contain one or more selected from [La, Zr, Ce, Y and Nd]. Any of [La, Zr, Ce, Y and Nd] is a component effective for the case of being added as an accessory component to the second compounds of the present invention. At least one element selected from [La, Zr, Ce, Y and Nd] or a compound thereof is added into the second compounds, whereby effects are obtained, such as: adsorption promotion for an acidic substance by an increase of surface alkalinity; and enhancement of heat resistance by achieving stabilization of a crystal structure of the second compounds by the addition of the elements of these accessory components. In the case where the second compounds are composed of the composite oxide of one or more selected from [Al and Si] and at least one element selected from [La, Zr, Ce, Y and Nd], there are mentioned $La_2O_3$, $ZrO_2$, $CeO_2$, $Y_2O_3$, $Nd_2O_3$ and the like as specific examples of oxides of [La, Zr, Ce, Y and Nd], which are constituent elements of the composite oxides. Moreover, a content ratio of the at least one element selected from [La, Zr, Ce, Y and Nd] or the compound thereof in the second compounds is not particularly limited; however, is less than 50 mol % since the second compounds contain, as a main component, one or more selected from [Al and Si] in the present invention.

Next, a description is made of a production method of the exhaust gas purifying catalyst of the present invention. First, the step of supporting the noble metal on the first compounds is performed. As one example of the step of supporting the noble metal on the first compounds, there can be adopted a step of forming the first compounds, with which the noble metal is brought into contact, into a colloid in which a primary particle diameter is 100 nm or less. Moreover, as another example of the step, there can be adopted a step of pulverizing secondary particle aggregates of the first compounds, thereby setting, at 2 μm or less, a secondary particle diameter of the first compounds with which the noble metal is brought into contact.

A description is made below of the former step of forming the first compounds, with which the noble metal is brought into contact, into a colloid in which a primary particle diameter is 100 nm or less. As this step, there can be adopted a step of preparing the colloid of the first compounds by a commercially available one or by separate preparation thereof, and bringing the colloid of the first compounds into contact with the noble metal. Specifically, noble metal salt is added and dispersed into the colloid of the first compounds, and thereafter, the noble metal is reduced and deposited on surfaces of the first compounds by using a reducing agent such as ethanol, and is thereby brought into contact therewith. Alternatively, colloid of the noble metal is added to the colloid of the first compounds, whereby the noble metal is brought into contact with the first compounds.

Figure 6:
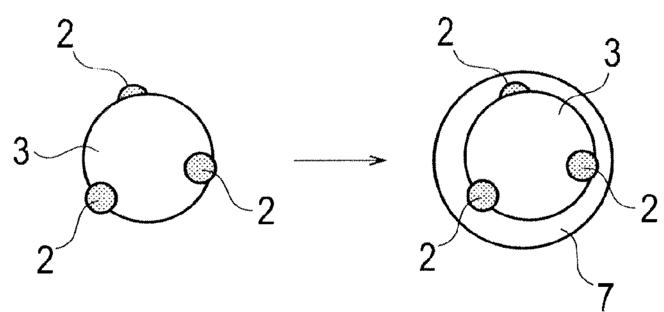
FIG. 6 is an explanatory view of an example of a process in a production method of the present invention.

In an explanatory view of this step, which is shown in FIG. 6, on a left side of an arrow, it is schematically shown that the noble metal particles 2 are in contact with each of the first compounds 3 by this step. Note that, in this step, the colloid of the first compounds can be covered with a dispersing protection material before the contact of the noble metal particles 2, or alternatively, can be covered with the dispersing protection material after the contact of the noble metal particles. On a right side of the arrow in FIG. 6, it is schematically shown that such a dispersing protection material 7 is formed in a manner of covering the first compound 3 with which the noble metal particles 2 are brought into contact. For example, this dispersing protection material 7 is a high molecular compound (polymer), nitric acid, acetic acid or the like, and can more effectively suppress the aggregation of the first compounds 3 with which the noble metal particles 2 are brought into contact. However, in the production method of the exhaust gas purifying catalyst of the present invention, the dispersing protection material 7 just needs to be used according to needs, and is not essential.

By the above-described step, the first compounds with which the noble metal is brought into contact are uniformly dispersed in a solution of the colloid, and accordingly, the first compounds with which the noble metal particles are brought into contact are suppressed from being aggregated with one another in the solution. In such a way, the secondary particle diameter of the first compounds of the exhaust gas purifying catalyst produced through a subsequent step can be easily set at 2 μm or less in terms of the median particle diameter. In order to set the secondary particle diameter of the first compounds of the exhaust gas purifying catalyst at 2 μm or less in terms of the median particle diameter, the primary particle diameter of the colloid is preferably 100 nm or less.

Next, a description is made of the step of pulverizing secondary particle aggregates of the first compounds, thereby setting, at 2 μm or less, a secondary particle diameter of the first compounds with which the noble metal is brought into contact, which is the latter step between those mentioned above as the steps of supporting the noble metal on the first compounds. This step is composed of a combination of an operation of preparing those having a particle diameter of a micron order as the first compounds and milling the first compounds, and an operation of supporting the noble metal on the first compounds. An order of the milling of the first compounds and the supporting of the noble metal on the first compounds is not particularly limited. For example, after the noble metal particles are supported on the first compounds, the first compounds can be milled. Moreover, the noble metal particles can also be supported on the first compounds during a period while the first compounds are being milled. Furthermore, after the first compounds are milled, the noble metal particles can also be supported thereon.

As a supporting method of the noble metal particles on the first compounds, an impregnation method, a spray method, a kneading method and the like are appropriately usable. Besides the above, a method may be adopted, in which precursor salt of the noble metal or the colloid of the noble metal and precursor salt of the first compounds are mixed with each other in an aqueous solution or the like, thereafter, the precursor salt of the first compounds is insolubilized, and a solvent is removed therefrom, followed by baking, whereby a part of the noble metal is included in the first compounds.

As a milling method of the first compounds, a milling method capable of setting the secondary particle diameter of the first compounds at 2 μm or less by using a milling machine such as a vibration ball mill, a planetary ball mill, a beads mill and a jet mill can be appropriately used. Here, the milling method includes wet milling, dry milling, ultrasonic milling and the like. The first compounds are milled, whereby the secondary median particle diameter of the first compounds of the exhaust gas purifying catalyst obtained finally by the production method of the present invention can be set at 2 μm or less.

After being milled, the first compounds are mixed with the dispersing protection material such as polyethylene imide and polymethacrylic acid, which is composed of a polymer, and can be thereby converted into the colloid. The first compounds are converted into the colloid, whereby stabilization of a finely dispersed state of the first compounds which support the noble metal can be achieved. Also as such a method of colloid conversion, a method of mixing the first compounds with a polymer protection material, and the like can be appropriately used. Also by other methods such as ultrasonic dispersion, it is possible to maintain a dispersion state of the first compounds until the subsequent step.

By milling the above-described first compounds, the first compounds on which the noble metal is supported become fine particles with a diameter ranging from several ten nanometers to several hundred nanometers, and are then surrounded as fine units by the second compounds at the time of being surrounded within the second compounds in the subsequent step. Therefore, the mutual aggregation of the first compounds after a durability test is a little, and a highly active catalyst can be obtained.

Next, in the production method of the exhaust gas purifying catalyst of the present invention, subsequently to the step of supporting the noble metal on the first compounds, which is described so far, the step of forming the second compounds on the peripheries of the pulverized first compounds with which the noble metal is brought into contact is performed.

Figure 7:
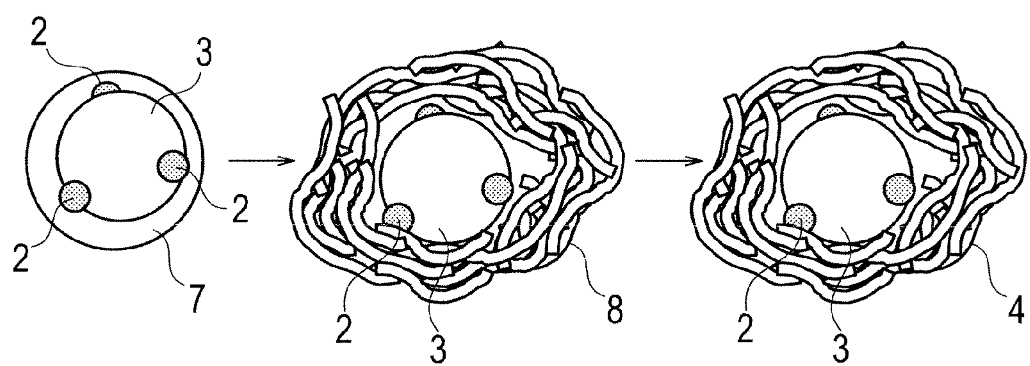
FIG. 7 is an explanatory view of the example of the process in the production method of the present invention.

A description is made of an example of this step by using a schematic explanatory view of FIG. 7. A raw material of the second compounds is added to each of the fine first compounds 3 on which the noble metal particles 2 are supported, the fine first compound 3 being as illustrated on a left side of this drawing. In such a way, as shown on a center of FIG. 7, a precursor 8 of each of the second compounds is formed on the periphery of the fine first compound 3 on which the noble metal particles 2 are supported. A forming method in this case may be either of the impregnation method or an inclusion method. Subsequently, as shown on a right side of FIG. 7, a solid content of the colloid solution in which the precursors 8 of the second compounds are formed is separated, and is dried by evaporating moisture, followed by baking, whereby the precursors 8 of the second compounds are turned to the second compounds 4. In such a way, the exhaust gas purifying catalyst of the present invention is obtained. For the evaporation of the moisture, besides evaporation of moisture by heating the same in a static state using a tray or the like, there are appropriately usable: electromagnetic wave heating using a microwave; vacuum drying by an evaporator and the like; spray heating by spray dry and the like; freeze drying; and the like.

The exhaust gas purifying catalyst of the present invention is applied and formed on a refractory honeycomb substrate and the like, and is allowed to serve for purification of the exhaust gas from the engine.

EXAMPLES

A description is specifically made below of the present invention based on examples.

[Production Method of Catalyst Powder]

Catalysts of Examples 1 to 6 and Comparative examples 1 and 2, which are shown in Table 1, were prepared. Production methods of these catalysts are as mentioned below.

TABLE 1

| | First compound (+Third compound) | | Second compound | Noble metal | | Amount of noble metal | Performance after |
|---|---|---|---|---|---|---|---|
| | Composition [mol %] | Median particle diameter [nm] | Composition [mol %] | Type | Supported amount [wt %] | in unit [mol] | durability test $\eta CH_4$ [%] |
| Example 1 | $TiO_2(100)$ | 200 | $Al_2O_3(85)$—$CeO_2(10)$—$ZrO_2(5)$ | Pt | 0.50 | $5.4 \times 10^{-27}$ | 70 |
| Example 2 | $TiO_2(80)$—$ZrO_2(20)$ | 300 | $Al_2O_3(95)$—$La_2O_3(5)$ | Pt | 0.50 | $1.8 \times 10^{-26}$ | 73 |
| Example 3 | $TiO_2(90)$—$BaO(10)$ | 90 | $Al_2O_3(100)$ | Pt | 0.30 | $2.9 \times 10^{-28}$ | 65 |
| Example 4 | $TiO_2(70)$—$CeO_2(30)$ | 350 | $Al_2O_3(85)$—$Y_2O_3(5)$ | Pt | 0.30 | $1.4 \times 10^{-26}$ | 70 |
| Example 5 | $TiO_2(80)$—$MgO(20)$ | 250 | $Al_2O_3(85)$—$Nd_2O_3(5)$ | Pd | 0.20 | $7.7 \times 10^{-27}$ | 65 |
| Example 6 | $TiO_2(80)$—$Nd_2O_3(20)$ | 300 | $SiO_2(100)$ | Rh | 0.20 | $1.4 \times 10^{-26}$ | 60 |

TABLE 1-continued

| | First compound (+Third compound) | | Second compound | Noble metal | | Amount of noble metal | Performance after |
|---|---|---|---|---|---|---|---|
| | Composition [mol %] | Median particle diameter [nm] | Composition [mol %] | Type | Supported amount [wt %] | in unit [mol] | durability test $\eta CH_4$ [%] |
| Comparative Example 1 | $CeO_2(75)$—$ZrO_2(25)$ | 200 | $Al_2O_3(85)$—$CeO_2(10)$—$ZrO_2(5)$ | Pt | 0.50 | $3.2 \times 10^{-27}$ | 50 |
| Comparative Example 2 | $Al_2O_3(100)$ | 3000 | — | Pt | 0.50 | — | 30 |

Example 1

As a raw material of the first compounds, commercially available needle-like rutile $TiO_2$ (primary particle diameter: 3 [μm]) was milled in pure water by a wet milling machine, and a median diameter thereof was set at 200 [nm] at the time of being measured by LA-920 made by HORIBA, Ltd., which is a laser scattering particle size distribution analyzer. An aqueous dinitrodiamine Pt solution (Pt concentration: 8.47 [wt %]) was dispersed into slurry containing the first compounds thus milled, a thus obtained solution was stirred for approximately two hours, whereby slurry containing the first compounds with which Pt was brought into contact was obtained. Meanwhile, boehmite slurry in which boehmite, cerium nitrate, zirconyl nitrate and pure water were mixed together was obtained. This slurry was mixed with the above-described slurry containing the first compounds with which Pt was brought into contact, and a thus obtained mixture was stirred by a high-speed stirrer.

Moisture of the stirred slurry was evaporated so that residual moisture could be 5% or less, was dried at 150 [° C.] for twelve hours, and was thereafter baked at 400 [° C.] for one hour under an air flow.

In such a way, a catalyst was obtained, in which Pt particles as the noble metal were supported on $TiO_2$ as the first compounds, and were further covered with Ce—Zr—$AlO_x$ as the second compounds. Note that individual molar ratios (mol %) of the respective components in the first compounds and the second compounds were adjusted so as to become values in Table 1. Moreover, an amount of the noble metal in each of the units was $5.4\times10^{-27}$ [mol] as a value in Table 1.

Example 2

A $TiO_2$—$ZrO_2$ composite oxide prepared as a raw material of the first compounds by a coprecipitation method was milled in pure water by a wet milling machine, and a median diameter thereof was set at 300 [nm] at the time of being measured by LA-920 made by HORIBA, Ltd., which is a laser scattering particle size distribution analyzer. An aqueous dinitrodiamine Pt solution (Pt concentration: 8.47 [wt %]) was dispersed into slurry containing the first compounds thus milled, and a thus obtained solution was stirred for approximately two hours. Thereafter, as a dispersing protection material, polyethylene imine (PEI) was further mixed by 20 [wt %] into the solution, and a thus obtained mixture was further stirred for two hours, whereby colloid was formed. Meanwhile, boehmite slurry in which boehmite, lanthanum oxynitrate and pure water were mixed together was obtained. This slurry was mixed with the above-described slurry containing the first compounds with which Pt was brought into contact, and a thus obtained mixture was stirred by a high-speed stirrer.

Moisture of the stirred slurry was evaporated so that residual moisture could be 5% or less, was dried at 150 [° C.] for twelve hours, and was thereafter baked at 400 [° C.] for one hour under an air flow.

In such a way, a catalyst was obtained, in which Pt particles as the noble metal were supported on a $TiO_2$—$ZrO_2$ composite oxide as the first compounds, and were further covered with La—$AlO_x$ as the second compounds. Note that individual molar ratios (mol %) of the respective components in the first compounds and the second compounds were adjusted so as to become values in Table 1. Moreover, an amount of the noble metal in each of the units was $1.8\times10^{-26}$ [mol] as a value in Table 1.

Example 3

An aqueous dinitrodiamine Pt solution (Pt concentration: 8.47 [wt %]) was dispersed into commercially available titania sol (primary particle diameter: 30 [nm]) and barium nitrate, which serve as raw materials of the first compounds. A thus obtained solution was stirred for two hours, whereby a suspension containing the first compounds with which Pt was brought into contact was obtained. Meanwhile, a solution was prepared, in which aluminum isopropoxide was mixed into hexylene glycol, and was dissolved in an oil bath of 120 [° C.]. Into this hexylene glycol solution of aluminum isopropoxide, the above-descried suspension of the mixture was slowly dropped in an oil bath of 80 [° C.], whereby aluminum hydroxide was formed on the peripheries of Pt, the titania sol and barium nitrate.

Thereafter, an oil bath temperature was gradually raised while stirring the solution under reduced pressure, and such a solvent was evaporated. Powder thus obtained was dried at 80 [° C.] for six hours, and further, at 150 [° C.] for twelve hours, and thereafter, was baked at 400 [° C.] for one hour under an air flow.

In such a way, a catalyst was obtained, in which a $TiO_2$—BaO composite oxide as the first compounds was present on the peripheries of Pt particles as the noble metal, and was further covered with alumina as the second compounds. Note that individual molar ratios (mol %) of the respective components in the first compounds and the second compounds were adjusted so as to become values in Table 1. Moreover, an amount of the noble metal in each of the units was $2.9\times10^{-28}$ [mol] as a value in Table 1.

Example 4

A $TiO_2$—$CeO_2$ composite oxide prepared as a raw material of the first compounds by a coprecipitation method was milled in pure water by a wet milling machine, and a median diameter thereof was set at 350 [nm] at the time of being measured by LA-920 made by HORIBA, Ltd., which is a laser scattering particle size distribution analyzer. An aqueous dinitrodiamine Pt solution (Pt concentration: 8.47 [wt %])

was dispersed into slurry containing the first compounds thus milled, and a thus obtained solution was stirred for approximately two hours. Meanwhile, boehmite slurry in which boehmite, yttrium nitrate and pure water were mixed together was obtained. This slurry was mixed with the above-described slurry containing the first compounds with which Pt was brought into contact, and a thus obtained mixture was stirred by a high-speed stirrer.

Moisture of the stirred slurry was evaporated so that residual moisture could be 5% or less, was dried at 150 [° C.] for twelve hours, and was thereafter baked at 400 [° C.] for one hour under an air flow.

In such a way, a catalyst was obtained, in which Pt particles as the noble metal were supported on a $TiO_2$—$CeO_2$ composite oxide as the first compounds, and were further covered with Y—$AlO_x$ as the second compounds. Note that individual molar ratios (mol %) of the respective components in the first compounds and the second compounds were adjusted so as to become values in Table 1. Moreover, an amount of the noble metal in each of the units was $1.4\times10^{-26}$ [mol] as a value in Table 1.

Example 5

Commercially available block-like rutile $TiO_2$ (primary particle diameter: 2 [μm]) and magnesium nitrate, which serve as raw materials of the first compounds, were milled in pure water by a wet milling machine, and a median diameter thereof was set at 250 [nm] at the time of being measured by LA-920 made by HORIBA, Ltd., which is a laser scattering particle size distribution analyzer. An aqueous Pd nitrate solution (Pd concentration: 20.71 [wt %]) was dispersed into slurry containing the first compounds thus milled, a thus obtained solution was stirred for approximately two hours, whereby slurry containing the first compounds with which Pd was brought into contact was obtained. Meanwhile, boehmite slurry in which boehmite, neodymium nitrate and pure water were mixed together was obtained. This slurry was mixed with the above-described slurry containing the first compounds with which Pd was brought into contact, and a thus obtained mixture was stirred by a high-speed stirrer.

Moisture of the stirred slurry was evaporated so that residual moisture could be 5% or less, was dried at 150 [° C.] for twelve hours, and was thereafter baked at 400 [° C.] for one hour under an air flow.

In such a way, a catalyst was obtained, in which Pd particles as the noble metal were supported on a $TiO_2$—MgO composite oxide as the first compounds, and were further covered with Nd—$AlO_x$ as the second compounds. Note that individual molar ratios (mol %) of the respective components in the first compounds and the second compounds were adjusted so as to become values in Table 1. Moreover, an amount of the noble metal in each of the units was $7.7\times10^{-27}$ [mol] as a value in Table 1.

Example 6

An aqueous Rh nitrate solution (Rh concentration: 8.36 [wt %]) was dispersed into commercially available titania sol (primary particle diameter: 30 [nm]) and neodymium nitrate, which serve as raw materials of the first compounds. A thus obtained solution was stirred for two hours, whereby a suspension containing the first compounds with which Rh was brought into contact was obtained. Meanwhile, a solution was prepared, in which tetraethoxysilane was mixed into hexylene glycol, and was dissolved in an oil bath of 120 [° C.]. Into this hexylene glycol solution of tetraethoxysilane, the above-descried suspension of the mixture was slowly dropped in an oil bath of 80 [° C.], whereby $SiO_2$ precursors were formed on the peripheries of Rh, the titania sol and neodymium nitrate.

Thereafter, an oil bath temperature was gradually raised while stirring the solution under reduced pressure, and such a solvent was evaporated. Powder thus obtained was dried at 80 [° C.] for six hours, and further, at 150 [° C.] for twelve hours, and thereafter, was baked at 400 [° C.] for one hour under an air flow.

In such a way, a catalyst was obtained, in which a $TiO_2$—$Nd_2O_3$ composite oxide as the first compounds was present on the peripheries of Rh particles as the noble metal, and was further covered with $SiO_2$ as the second compounds. Note that individual molar ratios (mol %) of the respective components in the first compounds and the second compounds were adjusted so as to become values in Table 1. Moreover, an amount of the noble metal in each of the units was $1.4\times10^{-26}$ [mol] as a value in Table 1.

Comparative Example 1

Comparative example 1 is an example where the first compounds which support the noble metal are $CeO_2$—$ZrO_2$.

As a raw material of the first compounds, a commercially available $CeO_2$—$ZrO_2$ composite oxide (primary particle diameter: 30 [nm]) was milled in pure water by a wet milling machine, and a median diameter thereof was set at 200 [nm] at the time of being measured by LA-920 made by HORIBA, Ltd., which is a laser scattering particle size distribution analyzer. An aqueous dinitrodiamine Pt solution (Pt concentration: 8.47 [wt %]) was dispersed into slurry containing the first compounds thus milled, a thus obtained solution was stirred for approximately two hours, whereby slurry containing the first compounds with which Pt was brought into contact was obtained. Meanwhile, boehmite slurry in which boehmite, cerium nitrate, zirconyl nitrate and pure water were mixed together was obtained. This slurry was mixed with the above-described slurry containing the first compounds with which Pt was brought into contact, and a thus obtained mixture was stirred by a high-speed stirrer.

Moisture of the stirred slurry was evaporated so that residual moisture could be 5% or less, was dried at 150 [° C.] for twelve hours, and was thereafter baked at 400 [° C.] for one hour under an air flow.

In such a way, a catalyst was obtained, in which Pt particles as the noble metal were supported on the $CeO_2$—$ZrO_2$ composite oxide as the first compounds, and were further covered with Ce—Zr—$AlO_x$ as the second compounds. Individual molar ratios (mol %) of the respective components in the first compounds and the second compounds were adjusted so as to become values in Table 1. Moreover, an amount of the noble metal in each of the units was $3.2\times10^{-27}$ [mol] as a value in Table 1.

Comparative Example 2

Comparative example 2 is an example of a conventional general catalyst that does not have the second compounds.

Commercially available $Al_2O_3$ (particle diameter: 3 [μm]) was dispersed into an aqueous dinitrodiamine Pt solution (Pt concentration: 8.47 [wt %]) and pure water. A thus obtained solution was stirred for two hours, and thereafter, moisture was evaporated so that residual moisture could be 5% or less, was dried at 150 [° C.] for twelve hours, and was thereafter baked at 400 [° C.] for one hour under an air flow.

In such a way, a catalyst in which Pt particles as the noble metal were supported on $Al_2O_3$ as a support was obtained.

Note that, in Comparative example 2, a molar ratio (mol %) of alumina as the support was 100% as a value in Table 1.

[Durability Conditions]

The catalyst powders of Examples 1 to 6 and Comparative examples 1 and 2, which were produced in the manners as described above, were individually baked at 700 [° C.] for 5 [hr] in an air flow.

With regard to each of the catalysts after being subjected to the above-described durability treatment, a catalyst reaction apparatus TPD-1-AT made by BEL Japan, Inc. was used, simulation exhaust gas was flown therethrough under conditions of a reaction gas composition and a gas flow rate, which are shown in Table 2. A degree of $CH_4$ conversion ($\eta CH_4$) of each of the exhaust gas purifying catalysts in Examples 1 to 6 and Comparative examples 1 and 2 at 400 [° C.] was calculated from $CH_4$ concentrations on inlet and outlet sides of the apparatus. Note that a sample amount was set at 0.1 g, and a Quadrupole Mass spectrometer (Q-MASS) was used as a detector. Values of the degrees of $CH_4$ conversion are also written on Table 1.

TABLE 2

| Gas composition | Concentration [%] |
|---|---|
| $CH_4$ (%) | 2.0 |
| $O_2$ (%) | 2.5 |
| He (balance) | residue |

Gas flow rate: 50 cc/min

As obvious from Table 1, the catalyst powders of Examples 1 to 6 are remarkably superior to the catalyst powders of Comparative examples 1 and 2 in terms of the degree of $CH_4$ conversion after the durability treatment. This is considered to be because, in each of Examples 1 to 6, the degree of conversion for $CH_4$ is particularly enhanced since the first compounds are the oxide containing Ti.

The entire contents of Japanese Patent Application No. 2008-185189 (filed on: Jul. 16, 2008) are incorporated herein by reference.

The description has been made above of the embodiment to which the invention made by the inventors is applied. However, the present invention is not limited to the description and the drawings, which are in accordance with this embodiment and form a part of the disclosure of the present invention. It is additionally mentioned that, specifically, other embodiments, examples, operation technologies and the like, which are made by those skilled in the art based on the above-described embodiment, are entirely incorporated in the scope of the present invention.

INDUSTRIAL APPLICABILITY

In the case of being used for the engine to be operated in a state where the air-fuel ratio is on the leaner side than the stoichiometric ratio, the exhaust gas purifying catalyst of the present invention exerts excellent exhaust gas purification performance, and accordingly, can be suitably used for the direct injection engine, the diesel engine and the like.

The invention claimed is:

1. An exhaust gas purifying catalyst comprising:

units, each comprising: a noble metal; a first compound; and a second compound, and having a structure in which the noble metal is supported on the first compound, the first compound supporting the noble metal is surrounded by the second compound, and the first compound supporting the noble metal is isolated from an adjacent first compound by the second compound, wherein the noble metal is one or more element selected from the group consisting of Pt, Pd and Rh, the first compound contains $TiO_2$, and the second compound contains, as a main component, one or more element selected from the group consisting of Al and Si, and wherein an amount of $TiO_2$ in the first compound is within a range of 70-100 mol %.

2. The exhaust gas purifying catalyst according to claim 1, wherein each of the units comprises a unit in which an amount of the noble metal is $8\times10^{-20}$ mol or less.

3. The exhaust gas purifying catalyst according to claim 1, further comprising a third compound, wherein the first compound contains $TiO_2$ and the third compound is a compound of at least one element selected from the group consisting of Ce, Zr, Ba, Mg, W, Nd and Y.

4. The exhaust gas purifying catalyst according to claim 1, wherein the second compound further contains one or more element selected from the group consisting of La, Zr, Ce, Y and Nd.

5. A method of producing an exhaust gas purifying catalyst according to claim 1, the method comprising:

forming the first compound into a colloid in which a primary particle diameter is 100 nm or less, wherein the first compound is brought into contact with the noble metal; and subsequently forming the second compound on a periphery of the colloided first compound with which the noble metal is brought into contact.

6. A method of producing an exhaust gas purifying catalyst according to claim 1, the method comprising:

pulverizing a secondary particle aggregate of the first compound, thereby setting a secondary particle diameter of the first compound at 2 μm or less, wherein the first compound is brought into contact with the noble metal; and subsequently forming the second compound on a periphery of the pulverized first compound with which the noble metal is brought into contact.

7. An exhaust gas purifying catalyst comprising:

units, each comprising: a noble metal; a first compound; and a second compound, and having a structure in which the noble metal is supported on the first compound, the first compound supporting the noble metal is surrounded by the second compound, and the first compound supporting the noble metal is isolated from an adjacent first compound by the second compound, wherein the noble metal is one or more element selected from the group consisting of Pt, Pd and Rh, the first compound contains $TiO_2$, and the second compound contains, as a main component, one or more element selected from the group consisting of Al and Si, wherein an amount of $TiO_2$ in the first compound is within a range of 70-100 mol %, and wherein a median particle diameter of the first compound dispersed independently is 2 μm or less.

* * * * *